United States Patent [19]

Kühn

[11] 4,406,170
[45] Sep. 27, 1983

[54] REPEATING PIPETTING DEVICE

[75] Inventor: Günther Kühn, Hamburg, Fed. Rep. of Germany

[73] Assignee: Eppendorf Gerätebau Netheler & Hinz GmbH, Hamburg, Fed. Rep. of Germany

[21] Appl. No.: 350,402

[22] Filed: Feb. 19, 1982

Related U.S. Application Data

[63] Continuation-in-part of Ser. No. 162,528, Jun. 24, 1980, abandoned.

[30] Foreign Application Priority Data

Jul. 2, 1979 [DE] Fed. Rep. of Germany ....... 2926691

[51] Int. Cl.³ ............................................. B01L 3/02
[52] U.S. Cl. .............................. 73/864.16; 73/864.18; 222/287; 222/309; 222/326; 222/391; 422/100
[58] Field of Search ........................ 73/864.16, 864.18; 222/43, 49, 50, 391, 287, 309, 326, 327; 128/236, 218 A, 218 C; 422/100; 401/178

[56] References Cited

U.S. PATENT DOCUMENTS

| 2,164,711 | 7/1939 | Kadavy | 73/425.6 X |
|---|---|---|---|
| 2,768,768 | 10/1956 | Cornell et al. | 222/391 |
| 2,776,075 | 1/1957 | Etter | 222/43 |
| 3,160,156 | 12/1964 | Tyler | 128/236 |
| 3,178,076 | 4/1965 | Kennedy | 222/391 |
| 3,954,014 | 5/1976 | Andrews et al. | 128/236 X |
| 4,022,207 | 5/1977 | Citrin | 128/236 X |
| 4,046,290 | 9/1977 | Louder | 73/425.6 |
| 4,099,548 | 7/1978 | Sturm et al. | 73/425.6 X |
| 4,144,761 | 3/1979 | Dzaack | 73/425.6 X |

FOREIGN PATENT DOCUMENTS 51403 3/1965 .................................... 73/425.6

Primary Examiner—Arnold Turk
Attorney, Agent, or Firm—Toren, McGeady and Stanger

[57] ABSTRACT

A repeating pipetting device includes an elongated housing, a flange holder at one end of the housing for holding the flange of a syringe, a coupling assembly for connection to the plunger of the syringe, and a toothed rack connected to the coupling assembly and longitudinally reciprocable relative to the flange holder. A pawl is engageable with the teeth of the rack and is operable to advance the rack toward the flange holder in a succession of steps. An operating lever movable back and forth in the elongated direction of the housing, intermittently operates the pawl, and a return lever retracts the rack from the flange holder. A tongue-like cover or slide is provided within the device and covers the rack for a part of its length. The cover is slidably adjustable along the rack and has a portion engageable by the pawl which limits the extent to which the rack can be advanced by the pawl in each step.

11 Claims, 7 Drawing Figures

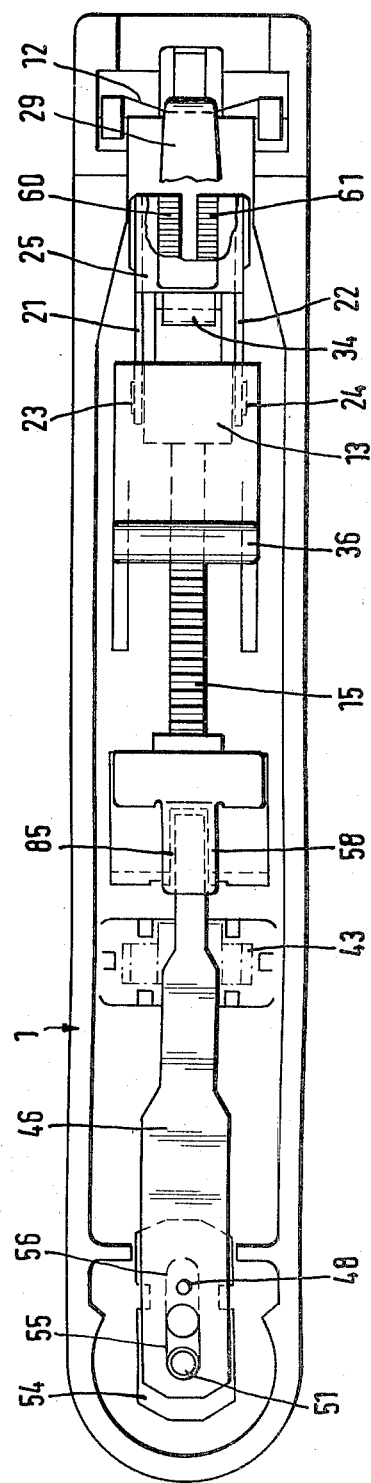
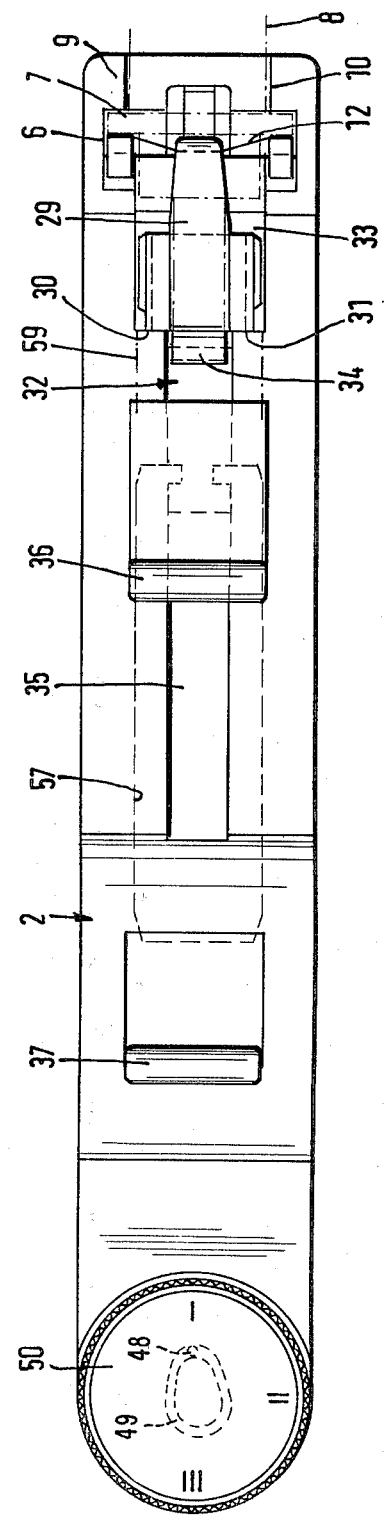
Fig. 2
Fig. 3

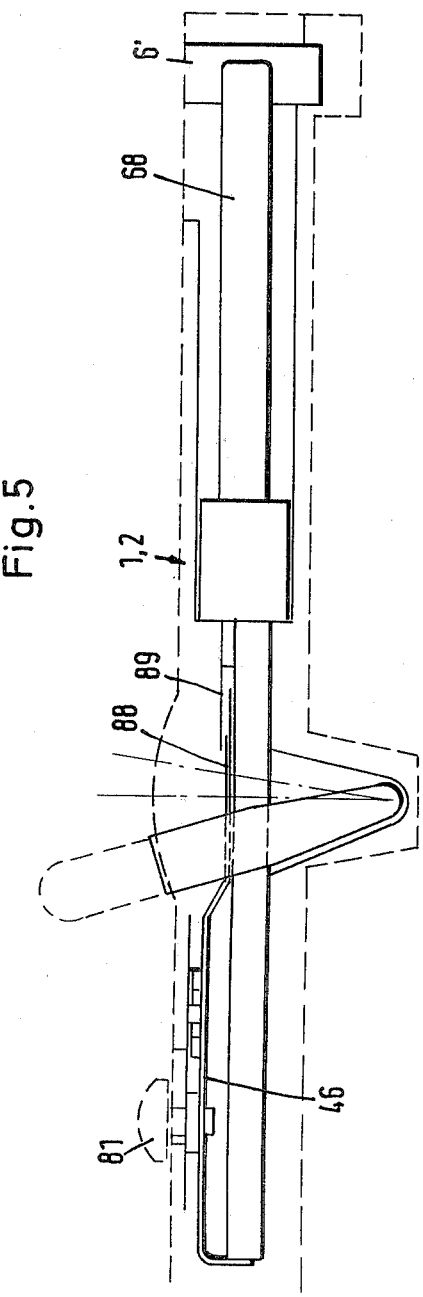
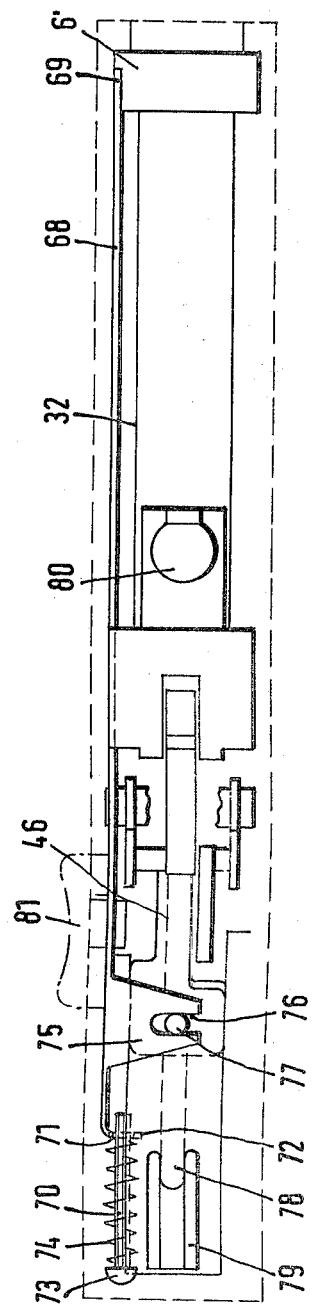

REPEATING PIPETTING DEVICE

CROSS-REFERENCE TO RELATED APPLICATIONS

This application is a continuation-in-part of application Ser. No. 162,528 filed June 24, 1980, now abandoned.

SUMMARY OF THE INVENTION

This invention relates to a repeating pipetting device comprising a flange holder for holding the flange of a syringe, coupling means for connection to the plunger of the syringe, and a toothed rack connected to the coupling means and longitudinally reciprocable relative to the flange holder. A pawl is engageable with the teeth of the rack and operable to advance the rack toward the flange holder in a succession of steps and is also arranged to restrain the rack between successive steps. An oscillatable operating lever intermittently operates the pawl, and a return lever retracts the rack from the flange holder.

Such a repeating pipetting device is known from West German Offenlegungsschrift 2,736,551. In that known device, the plunger can be advanced in each step only over a predetermined, invariable distance. Because the extent to which the plunger advances in each step cannot be changed, the known device has only a restricted field of application.

Other disadvantages of the known pipetting device are that the syringe must be inserted in the axial direction and a screw cap is used to hold a coupling element which is similar to a bayonet joint. In the known design, the return lever serves also to control the interlocking of the syringe plunger and the plunger-advancing mechanism when the return lever is in a specific position. In the known device, the plunger-advancing mechanism cooperates with a cam bar provided with a spring-loaded cam follower which cooperates with a profiled part of a plunger end portion that has been inserted. The conditions of interengagement are poorly defined and the use of the spring-loaded cam follower permits a change in the engagement so that the length of the steps will then be defined only with low accuracy. Above all, the known device is complicated and involves high manufacturing and assembling costs. This may also give rise to errors.

Therefore, it is a primary object of the invention to improve a repeating pipetting device of the kind described above so that its field of application is enlarged, the syringe can be more easily inserted, simplified means are provided to minimize the clearance volume in the syringe before it is filled, and a variable-step plunger-advancing mechanism is provided in conjunction with means for eliminating the remaining stroke length so that errors in operation can be avoided.

In accordance with the present invention, a tongue-like cover is provided, which covers the rack for a part of its length and is slidably adjustable along the rack and has a stop portion, which is enageable by the pawl for limiting the extent to which the rack can be advanced by the pawl in each step. Within the scope of the invention, the operating lever for the rack-and-pawl mechanism is biased by a spring for returning the operating lever to its initial position after each advancing stroke. As the operating lever returns, the pawl skips over the ratchet teeth of the rack.

In a particularly preferred embodiment, the tongue-like cover associated with the rack is arranged in the region in which the rack is engageable by the pawl so that the cover will determine the extent to which the plunger is advanced in each step and the volume to be discharged, and the operating lever is movable by equal strokes. In this arrangement the volume to be discharged can be easily adjusted so that the device can be operated more conveniently, because regardless of the adjusted volume to be discharged, the operating lever is always moved through the same stroke, to which the operator has become accustomed, however, the volume to be discharged can be adjusted.

Preferably, the slidable cover is displaceable by an adjusting member mounted on the housing of the device. In such an arrangement the volume to be discharged is easily selected by presetting the adjusting member. In a simple and suitable arrangement this is accomplished by the adjusting member which consists of a rotatable knob provided with an eccentric cam slot, and a guide pin on the slidable cover engageable in the slot. In such an arrangement the metering accuracy will not be adversely affected by tolerances even if they are almost as large as one tooth pitch of the rack.

The embodiment described thus far may be used together with a syringe having a plain flange.

In another advantageous embodiment the slidable cover is connected to a spring-loaded slider, which is guided in the housing of the device and extends into the flange holder and cooperates with a shaped portion of the syringe flange to position the slidable cover. The shaped portion of the syringe flange consists of a series of angularly spaced parts each of a different axial depth and engageable by the slider. The syringe is provided with inscriptions or other markings associated with the angularly spaced parts for indicating the volume to be discharged in one step. This feature is closely related to the design of the flange holder.

The slider is suitably biased by a compression spring, which urges the slider against the syringe flange. Within the scope of the invention, the slider can be connected to a setting knob, so that the slider can be retracted when the syringe flange is to be inserted.

In conjunction with the embodiment, the flange holder may comprise a substantially U-shaped, laterally open groove and a spring for applying axial pressure. The syringe flange can be inserted into the groove from the side in any desired rotational position. This design permits the rotational adjustment of the flange holder for adjustably selecting the volume to be discharged. The insertion from the side has also the basic advantage that the device is simple in design and can easily be operated, particularly because the correct insertion can be checked.

In a particularly preferred embodiment, the tongue-like cover associated with the rack is guided on the end portion of the rack more remote from the flange holder, and the end portion is provided with an upstanding projection, while the cover is provided with a ramp positioned over the teeth between the projection and the flange holder and facing the projection. After a sufficient advance, the rack is engaged by the projection so that the pawl-engaging portion of the cover is lifted and the pawl is disengaged from the rack. This feature in conjunction with the slidable cover permits an elimination of the unused stroke length because the pawl is disengaged when the remaining teeth of the rack are not sufficient for the stroke required to discharge the adjusted volume. As a result, the cover has a function in addition to its storke-limiting cooperation with the operating lever.

The free end portion of the cover suitable rises from the rack. This feature will particularly facilitate the setting of the cover in conjunction with the rack because an undesired interengagement is avoided.

To facilitate the insertion of the syringe flange, the coupling means for connection to the plunger are preferably formed with a compressible recess defined by two jaws and with a hinged flat clamping member associated with it. The clamping member has an actuating lever that protrudes out of the housing through a slot. In this arrangement the fixation of the plunger can be improved by the provision of profiled jaws defining the recess.

In a specific embodiment, the actuating lever is suitably narrower than the clamping element, the slot at the end thereof nearer to the flange holder has an enlarged portion which permits the clamping member to be swung out only at that end, and the coupling means are provided at the rear end of the recess between the clamping jaws with a spring axially prestressed toward the flange holder and consisting suitable of a leaf spring which tends to advance the plunger. This simple arrangement will minimize the clearance volume, because the syringe can be fitted only when the plunger has been advanced and the coupling means for connection to the plunger urge the latter forwardly when it has been connected.

In a modified embodiment, the slot is sufficiently wide throughout its length to permit the clamping element to be swung out in any position of the plunger. In this way the field of application of the repeating pipetting device can be improved because partly emptied syringes can also be inserted.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

FIG. 2 is a top plan view of FIG. 1;

FIG. 3 is a top plan view showing the pipetting device of FIG. 1, partly in section, with the upper housing section removed, and showing the tongue-like cover or slide;

FIG. 5 is a diagrammatic fragmentary side elevation showing a portion of another embodiment;

FIG. 6 is a diagrammatic top plan view of FIG. 5; and

DETAILED DESCRIPTION OF THE INVENTION

Figure 1:
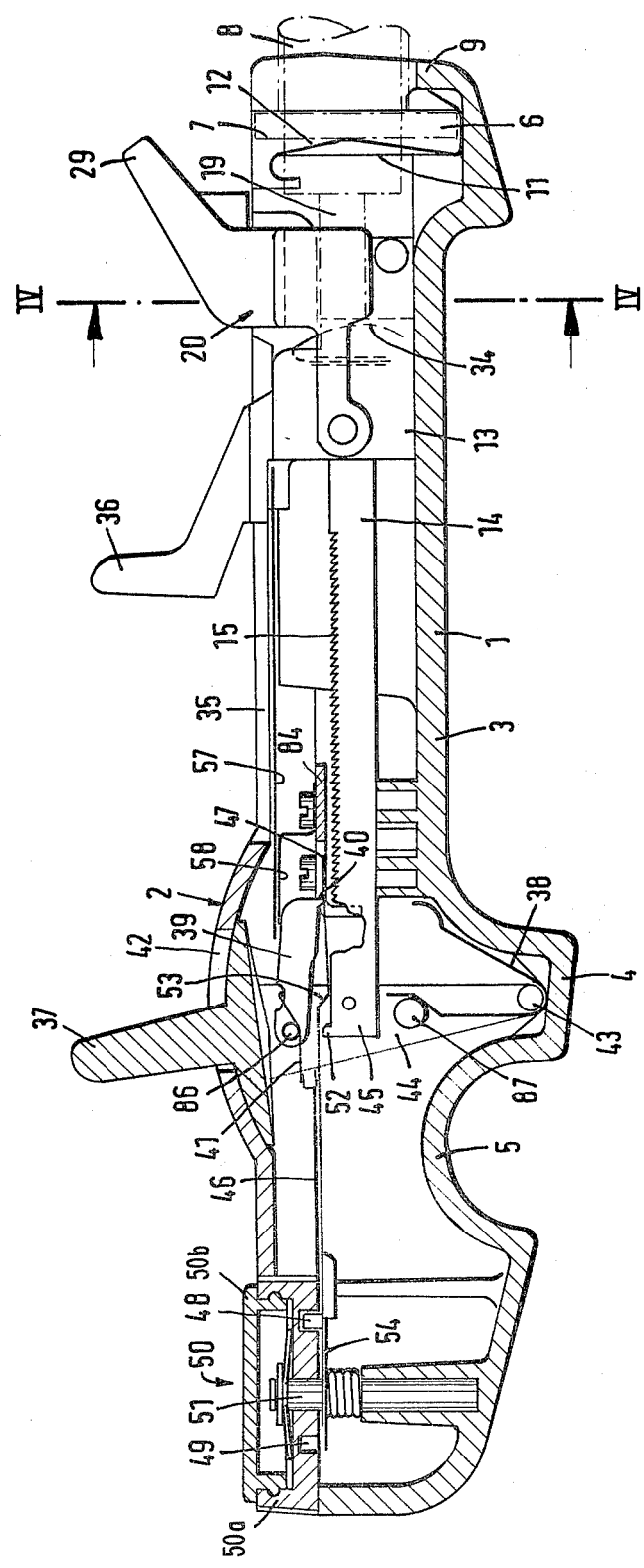
FIG. 1 is a vertical longitudinal central sectional view showing the repeating pipetting device.
Figure 4:
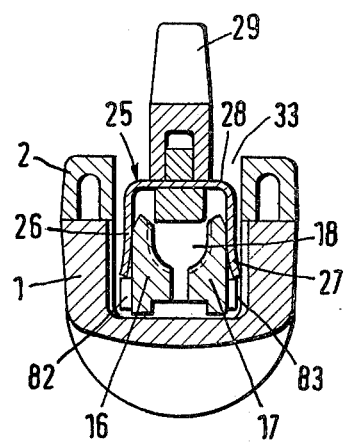
FIG. 4 is a sectional view taken on line IV—IV in FIG. 1.

In FIGS. 1 to 4, like reference characters designate like parts. The repeating pipetting device shown in FIGS. 1 to 4 has a housing consisting of a lower housing section 1 and an upper housing section 2. In FIGS. 1, 2 and 3 the right end is the forward end and the left end is the rearward end. The lower housing section has a recessed profiled portion 3 serving as a handle and includes a projection 4 followed by a shallow recess 5 for receiving a finger. At its forward end, the lower housing section is provided with a flange holder 6 for receiving a syringe flange 7, as indicated by dash-dot lines. From the flange 7, the body 8 of the syringe extends out of the housing 1, 2 to the right in the drawing. Flange holder 6 is an open-topped, U-shaped groove, having a forward boundary wall 9 and a rearward boundary wall 11. An opening 10 for the syringe body 8 extends through the forward boundary wall 9. An acruate compression spring 12 is disposed in front of the rearward boundary wall 11 and holds the flange 7 against the forward wall 9 in a defined postion. A sliding block 13 is guided in the housing. A rack 14 is secured to and extends from the sliding block 13 away from the flange holder 6 toward the rearward end of the housing. The rack with ratchet teeth 15 having steeper sides facing away from the flange holder 6. As is apparent in FIG. 4, the sliding block 13 is provided with two jaws 16, 17, defining an open-topped recess 18. The jaws 16, 17 can be compressed toward one another and are arranged to receive the end portion of a rod 19 forming the plunger of a syringe. A hinged flat clamping element 20 is associated with the recess and jaws. The clamping member 20 has two arms 21, 22, pivoted to the sliding block 13 by means of pivot pins 23, 24, and is provided with an inverted U-shaped clamping portion 25, and its legs 26, 27 embrace the jaws 16, 17 on the outside and force them toward each other as the clamping portion is swung into the position shown in FIG. 4. The clamping position of the clamping portion 25 is defined by stops 82, 83 and in the clamping position the jaws 16, 17 defining the recess are forced toward each other. It is apparent that the bight or web 28 of the clmaping portion 25, interconnecting the legs 26, 27 is wider than an actuating lever 29 centered on the clamping portion. As a result, the web 28 can be used as a locking element co-operating with shoulders 30, 31 of a slot 32 extending in the long direction of the housing so that the clamping portion 25 can be swung out only when it has been advanced toward the flange holder 6 ahead of the shoulders. Accordingly, the slot 32 has an enlarged or wider portion 33 near the flange holder 6 ahead of the shoulders 30, 31 and an adjoining narrower portion 35 rearwardly of the shoulders, in which the protruding actuating lever 29 can be moved but release of the clamping portion 25 is prevented. As a result, the syringe cannot be inserted unless the clamping portion 25 has been advanced ahead of the shoulders 30, 31. At the rear end of the recess 18 defined by the clamping jaws, the sliding block 13 is provided with a leaf spring 34, which is prestressed toward the flange holder 6 and, preferably, is curved and, as the plunger is inserted, it engages the end of the plunger and urges the plunger forwardly so that any clearance volume in the syringe is eliminated.

A return lever 36 is mounted on the sliding block and protrudes out through the narrower portion 35 of the slot. The lever 36 is operable to move the sliding block 13 and the parts carried thereby to the left or rearwardly in FIGS. 1 to 3.

An operating lever 37 extending upwardly out the upper housing section 2, is pivoted in the projection 4 of the lower housing section 1 and is biased by a spring 38, which urges the lever 37 to the left or rearwardly in FIG. 1. Within the housing sections 1, 2, the operating lever 37 includes a pawl 39 connected to the lever 37 and extending in the long direction of the housing. The pawl 39 is pivoted on a pin 86 and had a pawl tooth 40 at the its forward end. The pawl tooth 40 is interengageable with the ratchet teeth 15 on the rack 14. The pawl 39 is biased by a prestressed spring 41 toward the teeth 15.

The pawl 39 is movable within the housing under an angle lug 58 mounted on a clamping member 84 which bridges over the rack 14. The lug 58 serves as a guide for a slide plate 57 located in the housing above the rack. The slide plate 57 extends in the long direction of the housing. The clamping member 84 constitutes a lateral guide 85 for the forward end of a tongue-like cover or slide 46 located within the housing sections 1, 2.

In the position shown in FIG. 1, the operating lever 37 is in its initial or starting position. The lever 37 can be moved forwardly to the extent permitted by a slot 42 in the upper housing section 2 that is, for the length of the slot. When released after traversing the length of the slot the lever 37 is automatically returned to the starting position by the spring 38. For instance, the operating lever 37 is pivoted on a transverse pivot 43 and has two legs, one of which is designated 44 and which straddle the rearward end portion 45 of the rack.

Adjacent to the pawl 39, the rack is covered by the tongue-like cover or slide 46, which has a forward end portion 47 that permits the pawl 39 to engage the teeth 15 of the rack 14. Cover or slide 46 is guided within the housing for movement in the longitudinal direction of the housing. Near its rearward end the cover 46 has an upstanding pin 48, which engages an eccentric cam slot 49 shown in dashed lines in FIG. 2 of an adjusting member that consists of a rotatable knob 50. The knob 50 includes a cup-shaped lower part 50a and a closure or lid part 50b. Adjusting member/rotatable knob 50 is rotatable on a center pin 51, with respect to which the cam slot 49 is eccentric. The center pin is supported in the lower housing section 1. The lower part 50a of the knob 50 is rotatably mounted on the center pin 51 and the lid part 50b is located above and covers the center pin 51. The lid part 50b fits into the cup-shaped lower part 50a. Due to the engagement of the pin 48 in the eccentric cam slot 49, when the knob 50 is rotated the cover or slide 46 is moved in the long direction of the housing. For this reason the cover 46 can be moved in the long direction of the housing more or less over the rack teeth 15 so that the length of the rack 14 exposed to the pawl is varied and, because the stroke of the operating lever 37 is fixed, the advance of the rack 14 and of the sliding block 13 can also be varied providing an adjustment in the amount of liquid discharged from the syringe.

The rearward end portion 45 of the rack is provided with an upstanding projection 52, which serves to guide the tongue-like cover 46. Forwardly of the projection 52 closer to the rack teeth 15, the cover has a downwardly sloping ramp 53. When a certain discharge volume has been selected by setting the knob 50 and the volume of liquid remaining in the syringe is less than the selected volume, the projection 52 will engage the ramp 53 and lift the cover 46 and thereby disengage the pawl 39 from the rack teeth 15. This will prevent a discharge of less than the present quantity, since the pawl cannot engage and move the rack toward the forward end of the housing.

It is apparent that the portion of the cover 46 near the end 47 rises from the rack 14. As a result, the operating lever 37 can be moved forwardly without its pawl 39 engaging the rack teeth 15.

It is shown in FIG. 3 as well as in FIG. 1, that the cover 46 is guided in the region of the rotary knob 50 on a subjacent support 54 in order to permit a reliable actuation. It is also seen that the cover or slide 46 is formed with a longitudinal slot 55 extending in the long direction of the housing, which receives the mounting pin 51 that is, the pin extends upwardly through the slot with the cover movable relative to the pin. The support 54 has a corresponding longitudinal slot 56 for receiving a depending head, not illustrated, of the pin 48. This will improve the parallel guidance of the cover 46. The solts 55, 56 permit the movement of the cover 46 in the long direction of the housing.

The slot portion 35 in the upper housing section 2 is closed by a plate 57 located within the housing and above the rack 14 and extending in the long direction of the housing. The plate 57 is mounted at its forward end on the sliding block 13 and is guided at its rearward end on the angled lug 58 near the operating lever 37.

As is indicated in FIG. 2 by dotted lines at 59, the slot 32 may alternatively have the full width of the slot portion 33 throughout its length. In that case a syringe can be inserted even when the sliding block 13 has not been advanced as close as possible to the flange holder 6 and it is possible to insert also syringes which are, e.g., half-full when the plunger has been correspondingly advanced. This is possible because the actuating lever 29 and the clamping portion 25 can be swung out through any portion of the slot 32.

The recess 18 or the inside surfaces of the clamping jaws 16, 17 are suitably provided with profiled portions 60, 61 note FIG. 3, so that a firm grip of the inserted plunger end portion will be ensured.

The embodiment described above can be used with any syringes having properly dimensioned flanges and readily permits of the selection of a volume to be discharged by proper adjustment of the rotary knob 50.

As shown in FIG. 2, the knob 50 has three different settings, I, II and III. In an embodiment of the device used in practice the knob has five separate settings. It can be appreciated that the number of settings is a practical matter depending on the type and volume of the syringes used and the variable amount of liquid to be discharged from the syringe each time the operating lever 37 is moved forwardly for the full extent of the slot 42. While the operating lever is moved through the slot for the full extent each time liquid is to be discharged from the syringe, the amount of liquid discharged during each full movement of the operating lever is determined by the selected position of the knob 50. Though not shown in the drawing, a stop spring is positioned within the housing and cooperates with the knob 50 for stopping the knob in each of the selection settings for determining the amount of liquid to be discharged from the syringe.

The settings shown on the top surface of the knob 50 are uniform spacings of the rack teeth 15. For instance, position I corresponds to the volume displaced by moving the rack by one tooth spacing, position II corresponds to two tooth spacings and position III to three tooth spacings. As indicated above the number of setting positions and the corresponding number of tooth spacings can be increased to provide the desired range of discharge of liquid from the sryinge.

When the knob 50 is rotated about the center pin 51, the pin 48 upstanding from the cover or slide 46 is held in the eccentric cam slot 49, note FIG. 2, so that the spacing between the pin 48 and the center pin 51 is variable. As the knob 50 rotates the slot 49, the pin 48 moves relative to the slot 49 and the cover or slide 46 is also moved in the long direction of the housing with its forward end 47 being selectively positioned over the teeth 15 in the rack 14.

After the knob 50 has been set for the selected amount of liquid to be discharged from the syringe, the repeating pipetting operation can be commenced. Each time liquid is to be discharged from the syringe, the operating lever 37 is moved for the full length of the slot 42. After it completes the full forward stroke, the spring 38 returns the lever to the starting position, illustrated in FIG. 1. When the operating lever 37 is displaced forwardly, the pawl 38 pivoted on the lever also moves forwardly riding over the cover or slide 46 until it reaches the forward end 47 of the cover or slide. The full stroke of the operating lever carries the pawl forwardly of the forward end 47 so that it moves downwardly into engagement with one of the teeth 15 due to the biasing action of the spring 41. The position of the forward end 47 of the cover 46 determines the exposed teeth 15. If only one tooth is exposed then the pawl moves the rack forwardly by one tooth spacing. If, however, three teeth are exposed, then the pawl engages one of the teeth in the rack and displaces the rack forwardly by three tooth spacings. By dividing the number of teeth corresponding to the amount of liquid to be discharged, during each movement of the operating lever 37, into the total number of teeth, the number of strokes to be applied to the operating lever before the syringe is emptied or almost completely emptied can be determined.

After a syringe has been emptied it can be removed from the housing and another full syringe can be introduced to repeat the pipetting cycle. If the same amount of liquid is to be discharged by the pipetting device, the position of the knob is left the same, however, if the amount to be discharged is different, then the knob is reset to the desired discharge amount.

At the end of the pipetting cycle, the projection 52 contacts the ramp 53 on the cover or slide 46 and lifts it upwardly. As a result, if the operating lever 37 is pushed forwardly, the pawl moves with it over the cover or slide 46, however, because it has been displaced upwardly and held in that position by the projection 52, it is not possible for the pawl to move downwardly into contact with one of the teeth 15 of the rack 14, and further discharge of the liquid out of the syringe is prevented. This feature avoids any partial discharge of the liquid in the syringe if an amount remains which is less than the amount selected by positioning the knob.

Figure 7:
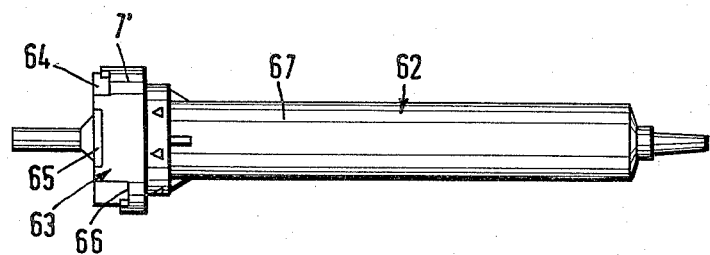
FIG. 7 shows a syringe for use with the pipetting device of FIGS. 5 and 6.

Another embodiment is shown in FIGS. 5 and 6 and is provided with a flange holder 6' for receiving a flange 7' of a syringe 62 (FIG. 7). The flange 7' has a shaped portion 63 formed with angularly spaced recesses 64, 65, 66, each of a different depth viewed in the long direction of the syringe. The cylindrical body 67 of the syringe may be provided with markings associated with the respective recesses to indicate the respective volume to be discharged.

A slider 68 is laterally disposed in and guided by the housing portions 1, 2 of the repeating pipetting device. The slider 68 has a forward free end portion 69 which extends into the flange holder 6' and in dependence on the rotation position of the syringe engages one of the recesses 64, 65, 66 of the shaped portion 63. At the other or rearward end, the slider 68 is guided on a pin 70 fixed in the rearward end of the housing and extending through a hole 71 in the angled rearward end portion 72 of the slider. A compression spring 74 is arranged between the angled rearward end portion 72 and a head 73 of the pin and urges the slider 68 to the right against the stepped rim 63 of the syringe 62. The slider 68 is provided with a laterally extending angled lug 75 having a slot 76 that receives an upstanding pin 77 on the tongue-like cover on the slide 46. In this embodiment the cover 46 has a rearward end extension 78 guided in a parallel guide 79 of the housing. As a result, the extent to which the cover 46 overlies the rack teeth 15 is adjusted by the stepped portion 63 of the flange 7' on the syringe 62. In this embodiment, the slot 32 in the top of the housing may be of uniform width along its length and a socket 80 is provided for receiving a ball-shaped plunger rod end, not illustrated. Adjacent its rearward end, the slider 68 is suitably connected to an adjusting knob 81, which can be used to retract the slider when the syringe flange is to be inserted.

Two different positions 88, 89 of the cover 46 are indicated in FIG. 5.

While specific embodiments of the invention have been shown and described in detail to illustrate the application of the inventive principles, it will be understood that the invention may be embodied otherwise without departing from such principles.

I claim:

1. A repeating pipetting device arranged to discharge repeated selected amounts of a liquid from a syringe, comprising an elongated housing having a forward end and a rearward end with a flange holder located at the forward end for receiving and holding the flange of a syringe, a sliding block mounted in said housing and slidable in said housing in the elongated direction thereof and arranged to be coupled to the plunger of the syringe held by said flange holder, a rack located in said housing and extending in the elongated direction thereof and secured to said sliding block and formed with a series of teeth extending along one surface thereof, an operating lever pivotally mounted in said housing on an axis extending transversely of the elongated direction of said housing, said lever extending partly inside and partly outside said housing, said lever being pivotally displaceable between a starting position and an ending position for a constant step length, a pawl pivoted to said lever inside said housing and arranged to engage said teeth on said rack as said operating lever moves between the starting and ending positions, and movable by said operating lever to advance said rack toward said flange holder, said pawl being pivotally engageable and disengageable from said teeth, a tongue-like slide cover mounted in said housing and slidable in the elongated direction of said housing, said cover is positioned between said pawl and said rack and overlies said rack for at least a part of the length thereof, wherein said cover has one end portion nearer to said flange holder and engagement of said pawl with said rack occurs when said pawl passes said one end portion, and adjusting means for adjusting the slidable position of said cover along the elongated direction of said housing for selecting the amount to be dispensed from said syringe.

2. A repeating pipetting device, as set forth in claim 1, in which said adjusting means comprise
- a knob which is rotatably mounted in said housing about a central axis and accessible from the outside thereof and said knob has a cam slot disposed eccentrically about said central axis, and
- a cam follower pin is secured to said cover and engages in said cam slot for movably adjusting the position of said cover as said knob is rotated about said central axis.

3. A repeating pipetting device, as set forth in claim 1, wherein
said adjusting means comprise a slider connected to said cover extending in the long direction of said housing from said rearward end thereof and connected to said flange holder, and
a spring located in said housing and biasing said slider toward said flange holder and into engagement with one of a plurality of angularly spaced parts of varying depth in a syringe flange held in said flange holder,
whereby the position of said cover along said housing is controlled by the axial depth of the part engaged by said slider.

4. A repeating pipetting device as set forth in claim 3, including a knob which is connected to said slider and protruding outwardly from said housing and said knob is operable to retract said slider from said flange holder when a mounting flange is to be inserted into said flange holder.

5. A repeating pipetting device as set forth in claim 1, wherein said flange holder comprises a laterally open, substantially U-shaped groove extending transversely of the long direction of said housing and having a forward boundary wall, and a spring disposed in said housing and arranged to engage the flange of the syringe mounted in said flange holder and to apply pressure to the syringe flange in the long direction of said housing to hold the syringe flange in position against said forward boundary wall.

6. A repeating pipetting device, as set forth in claim 1, including means on said rack and cover for interengagement when the volume in the syringe is less than the selected volume to be dispensed so that said cover maintains said pawl out of engagement with said teeth on said rack, wherein
said cover is guided by said rack at the end of said rack remote from said flange holder,
said rack is provided at said end remote from said flange holder with an upstanding projection,
said cover is provided between said projection and said flange holder with a ramp, located above said teeth and arranged to be engageable by said projection, and
said projection is arranged to engage said ramp to lift the other end portion of the cover and to maintain said pawl out of engagement with said teeth.

7. A repeating pipetting device as set forth in claim 1, wherein
said housing forms a longitudinal slot, and
said sliding block comprises two jaws defining the opposite sides of an open-topped recess in said block with said jaws being movable toward one another to reduce the width of said recess, a hinged flat clamping member pivotally displaceable about an axis extending transversely of the long direction of said housing into contact with the outer surface of said jaws, and a pivotally displaceable actuating lever connected to said clamping member and extending through said slot and out of said housing.

8. A pipetting device as set forth in claim 7 wherein in the direction extending transversely of the long direction of said housing said actuating lever is narrower than said clamping member,
said slot has an enlarged portion extending transversely of the long direction of said housing at its end closer to said flange holder,
said clamping member is pivotally movable out of said housing only through said enlarged portion, and
said sliding block is provided at the rear end of said recess between said clamping jaws with a prestressed spring arranged to urge the plunger of the syringe held by said flange holder toward said flange holder when the plunger extends into said recess.

9. A pipetting device according to claim 7, wherein the width of said slot extending transversely of the long direction of said housing throughout its length is sufficient to permit said clamping member to be pivotally displaced out of said housing through said slot.

10. A repeating pipetting device comprising a syringe including a syringe body having a forward end and a rearward end, a mounting flange located at the rearward end of said syringe body and a plunger, said plunger has a portion that protrudes rearwardly from said mounting flange, said flange being formed with a rearwardly facing, shaped portion having angularly spaced parts differing in axial depth, and
a device for actuating said syringe, which actuating device comprises
an elongated housing having at one end a flange holder, in which said mounting flange is removably held,
a sliding block mounted in said housing and slidable in the elongated direction thereof and coupled to said rearwardly protruding portion,
a rack located in said housing and extending in the elongated direction thereof, said rack is secured to said sliding block and is formed with a series of teeth along one surface thereof extending in the long direction of said housing,
an operating lever is pivoted to said housing about an axis extending transversely of the elongated direction of said housing, said operating lever extending partly inside and partly outside said housing, said lever being pivotally displaceable between a starting position and an ending position for a constant step length,
a pawl pivoted to said operating lever inside said housing and arranged to engage said teeth and being operable by said operating lever to advance said rack toward said flange holder, said pawl is pivotally engageable and disengageble from said teeth,
a tongue-like slide cover mounted in said housing and slidable in the elongated direction thereof, said cover is positioned between said pawl and said rack and overlies said rack along a part of its length and has one end portion nearer to said flange holder and engagement of said pawl with said rack occurs when said pawl passes said one end portion, and adjusting means for adjusting the slidable position of said cover in the elongated direction of said housing, said adjusting means comprising a slider connected to said cover and extending therefrom into connection with said flange holder, and a spring mounted in said housing and urging said slider toward said flange holder and into engagement with one of said angularly spaced parts of said flange of said syringe whereby the position of said cover along said housing is controlled by the axial depth of said part engaged by said slider.

11. A repeating pipetting device, as set forth in claim 1 or 10 including means on said rack and cover for interengagement when the volume in said syringe is less than the selected volume to be dispensed so that said cover displaces said pawl so that it cannot engage with said teeth on said rack and means for displacing said sliding block in the long direction of said housing away from said flange holder.

* * * * *